(12) United States Patent
Warren

(10) Patent No.: US 11,158,348 B1
(45) Date of Patent: Oct. 26, 2021

(54) USING WEB-BASED PROTOCOLS TO ASSIST GRAPHIC PRESENTATIONS IN DIGITAL VIDEO PLAYOUT

(71) Applicant: Harmonic, Inc., San Jose, CA (US)

(72) Inventor: Timothy John Michael Warren, Hong Kong (HK)

(73) Assignee: Harmonic, Inc., San Jose, CA (US)

( * ) Notice: Subject to any disclaimer, the term of this patent is extended or adjusted under 35 U.S.C. 154(b) by 478 days.

(21) Appl. No.: 15/699,544

(22) Filed: Sep. 8, 2017

Related U.S. Application Data

(60) Provisional application No. 62/385,014, filed on Sep. 8, 2016.

(51) Int. Cl.
| | |
|---|---|
| H04N 9/80 | (2006.01) |
| G11B 27/036 | (2006.01) |
| H04N 21/2668 | (2011.01) |
| H04N 21/81 | (2011.01) |
| G06F 16/958 | (2019.01) |
| G06F 40/14 | (2020.01) |
| G06F 40/186 | (2020.01) |

(52) U.S. Cl.
CPC .......... *G11B 27/036* (2013.01); *G06F 16/986* (2019.01); *G06F 40/14* (2020.01); *G06F 40/186* (2020.01); *H04N 21/2668* (2013.01); *H04N 21/8146* (2013.01)

(58) Field of Classification Search
USPC .................................................. 386/242–248
See application file for complete search history.

(56) References Cited

U.S. PATENT DOCUMENTS

| | | | | |
|---|---|---|---|---|
| 6,580,870 B1* | 6/2003 | Kanazawa | ............. | G11B 27/34 386/240 |
| 9,008,491 B2* | 4/2015 | Kulas | .................. | H04N 21/443 386/239 |
| 9,245,706 B2* | 1/2016 | Yang | ....................... | C01B 33/26 |
| 9,583,148 B2* | 2/2017 | Dabous | ................. | G06Q 30/02 |
| 9,609,260 B2* | 3/2017 | Kulas | ................. | H04N 5/44543 |
| 2008/0031590 A1* | 2/2008 | Kulas | .................. | H04N 9/8227 386/248 |
| 2008/0184121 A1* | 7/2008 | Kulas | ................. | G06F 3/04842 715/723 |

(Continued)

*Primary Examiner* — Nigar Chowdhury
(74) *Attorney, Agent, or Firm* — Brokaw Patent Law PC; Christopher J. Brokaw

(57) ABSTRACT

Playing out digital video with customized graphics whose appearance and operation are specified by a graphics template expressed using one or more web-based protocols. One or more software modules, executing on a media server, identify, for a particular digital video, a markup language document which describes a customized appearance of one or more graphics to be incorporated into a presentation of particular digital video. The markup language document may be an Extensible Markup Language (XML) document or a HyperText Markup Language (HTML) document. The media server plays out the particular digital video with the one or more graphics in accordance with the markup language document. An HTML rendering engine, executing on the media server, may pass through one or more audio streams to be incorporated into an output stream used in playing out the particular digital video without re-encoding the one or more audio streams.

15 Claims, 2 Drawing Sheets

(56) References Cited

U.S. PATENT DOCUMENTS

| | | | |
|---|---|---|---|
| 2008/0285940 A1* | 11/2008 | Kulas | G11B 27/3027 386/248 |
| 2009/0210778 A1* | 8/2009 | Kulas | G06Q 10/107 715/201 |
| 2011/0087974 A1* | 4/2011 | Kulas | G06F 3/04812 715/760 |
| 2014/0044407 A1* | 2/2014 | Kuznetsov | H04L 29/06027 386/241 |
| 2014/0143386 A1* | 5/2014 | Sokoryansky | H04L 67/32 709/219 |
| 2015/0379765 A1* | 12/2015 | Gallo | G06T 17/05 340/525 |

* cited by examiner

USING WEB-BASED PROTOCOLS TO ASSIST GRAPHIC PRESENTATIONS IN DIGITAL VIDEO PLAYOUT

CLAIM OF PRIORITY

This application claims priority to U.S. Provisional Patent App. Ser. No. 62/385,014, entitled, "Using Web-Based Protocols to Assist Graphic Presentations in Digital Video Playout," filed on Sep. 8, 2016, invented by Tim Warren, the disclosure of which is hereby incorporated by reference in its entirety for all purposes as if fully set forth herein.

FIELD OF THE INVENTION

Embodiments of the invention generally relate to a managing the display of graphics in a digital video playout environment.

BACKGROUND

In television broadcasting, the term "playout" is widely used to refer to the transmission of television channels from the broadcaster into broadcast networks that deliver the content to the audience. Example broadcast networks include NBC, ABC, CBS, the CW, and Fox. Video playout often occurs in a specialized facility that is owned by a broadcaster or operated by an independent specialist company that has been contracted to handle the playout for a number of channels from different broadcasters.

Modern television often utilizes the display of graphics in the foreground of television shows. For example, the logo of a broadcast network may be displayed in a bottom corner of a screen. As another example, a news ticker (also referred to a "crawler" or "slide") may display slowly advancing text in the bottom portion of the screen. Animations or other graphical images may also be shown for various reasons, such as to signal a transition or as an advertisement for an upcoming show.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for playing out digital video with customized graphics are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

In the present state of the art, templates are used in specifying the presentation of certain graphical elements in a digital video playout environment. It has been observed that the present state of the art suffers from the burden of requiring those involved in the production and deployment of such templates to be immersed and skilled in certain technologies which are arcane, cumbersome, and not widely known. Consequently, the cost and time involved in preparing templates for a digital video playout environment is high. This burden is especially troubling as the need for customized templates is increasing with the increasing trend of localizing digital content and the growing number of content distribution channels.

Embodiments of the invention provide for a new paradigm in the creation and use of graphics templates employed in a digital video playout environment vis-à-vis the use of protocols from an entirely different context, namely web-based protocols. Approaches described herein enable broadcast networks or their delegates to design their own graphics templates, for a digital video playout environment, expressed in web-based protocols such as Extensible Markup Language (XML) or HyperText Markup Language (HTML). In this way, the cost and effort in developing graphics templates for digital video playout environments may be reduced. Additional benefits and advantages provided by other embodiments shall be discussed below.

Figure 1:
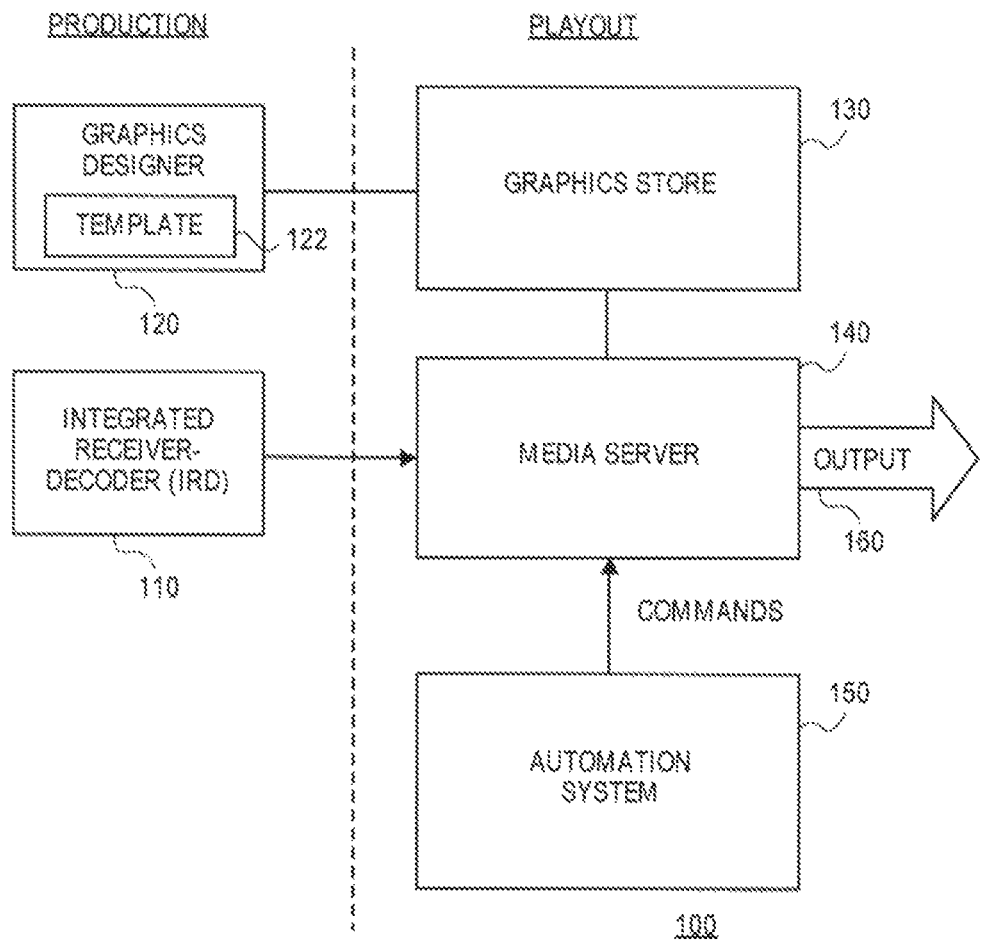
FIG. 1 is a block diagram illustrating a digital video playout environment according to an embodiment of the invention.

FIG. 1 is a block diagram illustrating a digital video playout environment according to an embodiment of the invention. System 100 depicts a production environment and a playout environment. The production environment involves the creation and production of both live digital content and prepared content, which includes graphics templates 122. The playout environment refers to the environment involved in transmitting live and prepared content to broadcast networks that deliver the content to their audience.

The production environment may include both an integrated receiver-decoder (IRD) 110 and a graphics designer 120. While only one IRD 110 and one graphics designer 120 are depicted in FIG. 1, embodiments of the invention may employ any number of individual IRDs 110 and graphic designers 120.

IRD 110 is an electronic device which receives contribution feeds that are intended for re-broadcasting. IRD 110 may act as the interface between a receiving satellite dish or a telephone company network and a broadcasting facility video/audio infrastructure. A non-limiting, commercial example of IRD 110 is the Harmonic ProView family of products, available from Harmonic, Inc. of San Jose, Calif.

Graphics designer 120, as broadly used herein, represents any type of computer system upon which a user may configure and construct a graphics template 122. Graphics designer 120 may comprise software, which when executed, enables a user at a broadcast company, or their delegate, to design a graphics template 122 using a user interface or other such means.

A feature of an embodiment is that graphics template 122 is expressed using a web-based protocol, such as without limitation, Extensible Markup Language (XML), HyperText Markup Language (HTML) version 5.0 or later, and JavaScript. A graphics template is generally used in conjunction with a particular channel of the broadcast network.

Graphics template 122 may instruct how certain dynamic and static content is to be presented in digital video played out by media server 140. Example of dynamic content which may be specified by graphics template 122 are stock information, weather information, sports scores, and the text of a news ticker. Examples of static content which may be specified by graphics template 122 is a logo or graphic.

The playout environment may include graphics store 130, media server 140, and automation system 150. While only one graphics store 130, media server 140, and automation system 150 are depicted in FIG. 1, embodiments of the invention may employ any number of individual graphics stores 130, media servers 140, and automation systems 150.

The playout environment may correspond to a variety of different contexts. For example, the playout environment may correspond to, or be implemented by, an appliance at or accessible to the production environment. Alternately, the playout environment may be implemented by a cloud environment in which one or more components of the playout environment are located remotely over a network (such as but not limited to the Internet or an Intranet) from one another.

Graphics store 130 represents a persistent storage medium for storing a variety of content to be played out by media server 140. After a graphics template 122 has been defined using graphics designer 120, a user may instruct graphics designer 120 to upload or transmit a copy of the defined graphics template 122 to graphics store 130 for storage thereon. A non-limiting, commercial example of graphics store 130 is the Harmonic MediaGrid family of products, available from Harmonic, Inc. of San Jose, Calif. In an embodiment, graphics store 130 may store a graphics template 122 either locally or at another location accessible to graphics store, such as a storage mechanism accessible over a network via a web-based address.

Media server 140 is responsible for "playing out" or transmitting live television content and prerecorded television content to a broadcast network. A non-limiting, commercial example of media server 140 is the Harmonic Spectrum family of products, available from Harmonic, Inc. of San Jose, Calif. Output 160 of media server 140 represents various channels of content to be delivered to a broadcast network. Media server 140 may switch between live content (such as a live sporting event) and prerecorded content (such as an advertisement) on a particular channel in accordance with the commands received from automation system 150. In an embodiment, media server 140 may obtain live and/or prerecorded television content to be played out over a broadcast network from a variety of sources, such as a local source or retrieved from a remote source, located over a network, using a web-based address.

Automation system 150, as broadly used herein, represents a device for sending commands and instructions to media server 140. Automation system 150 may be used to send commands to media server 140 for instructing media server what content to display on a particular channel. Additionally, automation system 150 may be used to specify what graphics templates 122 should be used in displaying graphics on a particular channel. Automation system 150 may record a user's instruction with respect to when and how a particular graphics template 122 should be used on a particular channel, and those instructions will be communicated to media server 140 where those instructions are subsequently performed by media server 140.

Figure 2:
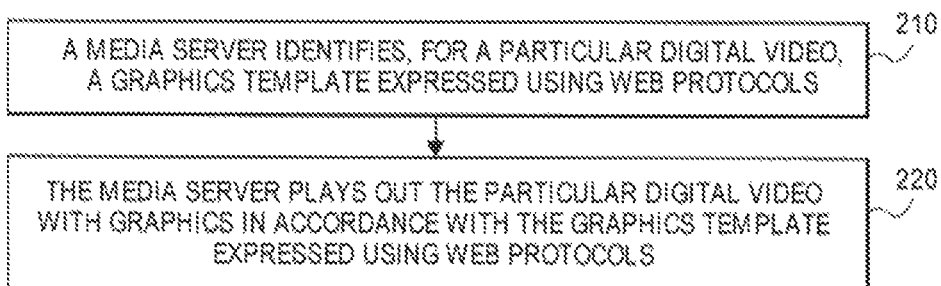
FIG. 2 is a flowchart illustrating the steps of playing out digital video with customized graphics according to an embodiment of the invention.

FIG. 2 is a flowchart illustrating the steps of generating captions for digital video according to an embodiment of the invention. In step 210, media server 140 identifies, for a particular digital video, a particular graphics template 122 expressed using web-based protocols. Media server 140 may be instructed by automation system 150 as to which particular graphics template 122 should be used for a particular channel and in which circumstance. For example, a certain graphics template 122 may be used to indicate a news ticker during a particular television show, while a different graphics template may be used to display a corporate logo in the bottom of a screen during a different television show.

In step 220, in response to a command from automation system 150, media server 140 plays out a particular digital video with graphics in accordance with a particular graphics template 122 expressed using web-based protocol. In an embodiment, media server 140 may comprise a rendering engine capable of rendering web-based protocols such as XML, HTML, and JavaScript. The rendering engine may render a graphics template 122 and overlay the rendered output on top of the digital video, which will be subsequently used as the channel source as output 160.

In an embodiment, the web-based protocol rendering engine, executing on media server 140, may opt to not re-encode any audio content and instead, allow any audio content to pass through the rendering engine without re-recoding; consequently, the audio content will be disposed within output stream without re-encoding by the web-based protocol rendering engine. While typical HTML rendering engines do not function in this matter, such an embodiment is advantageous as it is difficult or not feasible to re-encode certain audio formats, such as Dolby.

Figure 3:
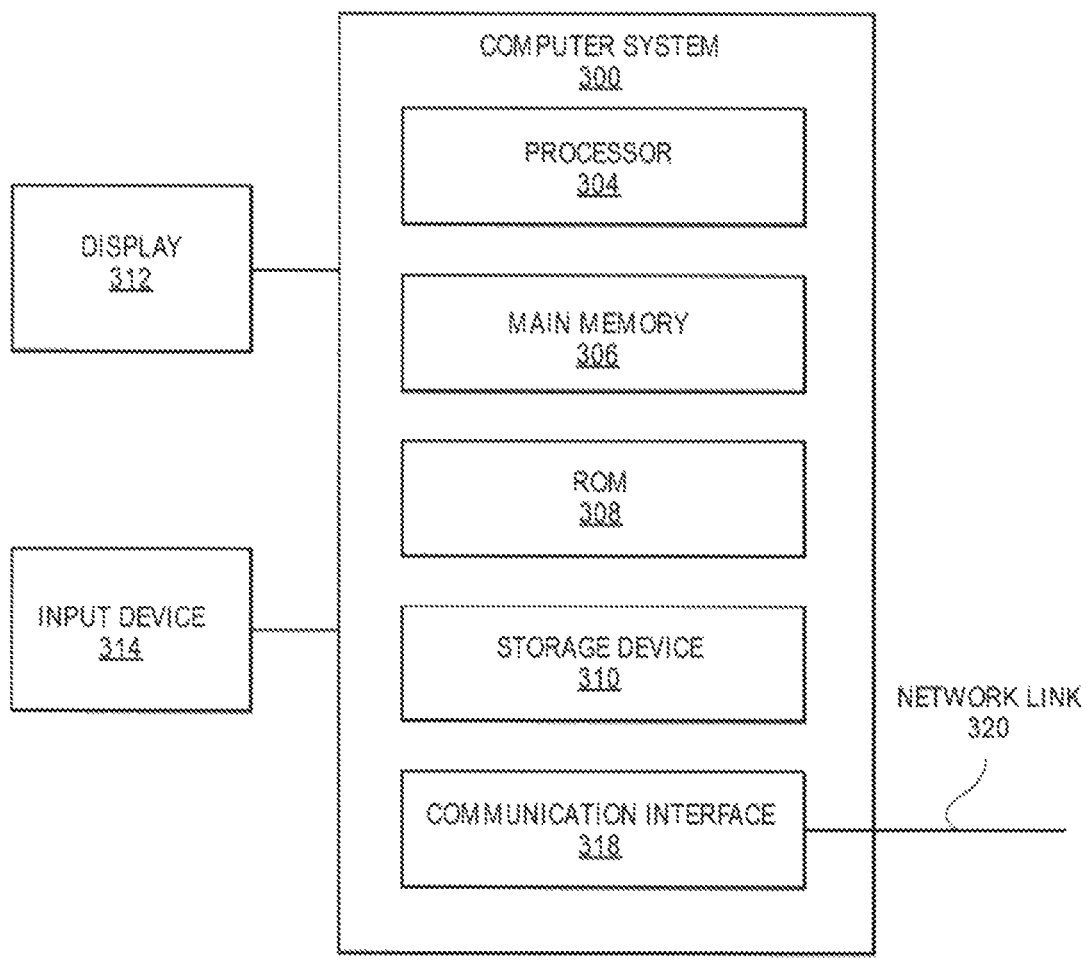
FIG. 3 is a block diagram that illustrates a computer system upon which an embodiment of the invention may be implemented.

In an embodiment, IRD 110, graphics designer 120, graphics store 130, media server 140, and automation system 150 may each be implemented by one or more computer systems. FIG. 3 is a block diagram that illustrates a computer system 300 upon which an embodiment of the invention may be implemented. In an embodiment, computer system 300 includes processor 304, main memory 306, ROM 308, storage device 310, and communication interface 318. Computer system 300 includes at least one processor 304 for processing information. Computer system 300 also includes a main memory 306, such as a random access memory (RAM) or other dynamic storage device, for storing information and instructions to be executed by processor 304. Main memory 306 also may be used for storing temporary variables or other intermediate information during execution of instructions to be executed by processor 304. Computer system 300 further may include a read only memory (ROM) 308 or other static storage device for storing static information and instructions for processor 304. A storage device 310, such as a magnetic disk or optical disk, is provided for storing information and instructions.

Computer system 300 may be, but need not be, coupled to a display 312, such as a cathode ray tube (CRT), a LCD monitor, and a television set, for displaying information to a user. An input device 314, including alphanumeric and other keys, may be, but need not be, coupled to computer system 300 for communicating information and command selections to processor 304. Other non-limiting, illustrative examples of input device 314 include a mouse, a trackball, or cursor direction keys for communicating direction information and command selections to processor 304 and for controlling cursor movement on display 312. While only one input device 314 is depicted in FIG. 3, embodiments of the invention may include any number of input devices 314 coupled to computer system 300 or may not include an input device 314 at all.

Embodiments of the invention are related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any tangible medium that participates in storing instructions which may be provided to processor 304 for execution. Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 304 for execution. For example, the instructions may initially be carried on a magnetic disk of a remote computer. The remote computer can load the instructions into its dynamic memory and send the instructions over a network link 320 to computer system 300.

Communication interface 318 provides a two-way data communication coupling to a network link 320 that is connected to a local network. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through a local network to a host computer or to data equipment operated by an Internet Service Provider (ISP).

Computer system 300 can send messages and receive data, including program code, through the network(s), network link 320 and communication interface 318. For example, a server might transmit a requested code for an application program through the Internet, a local ISP, a local network, subsequently to communication interface 318. The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences of instructions for playing out digital video with customized graphics, which when executed by one or more processors, cause:

at a media server, one or more software modules identifying, for a particular digital video, a markup language document which describes a customized appearance of one or more graphics to be incorporated into a presentation of particular digital video; and the media server playing out the particular digital video with the one or more graphics in accordance with the markup language document, wherein said media server playing out the particular digital video comprises said media server transmitting the particular digital video from a broadcaster into a broadcast network.

2. The non-transitory computer-readable storage medium of claim 1, wherein the markup language document is an Extensible Markup Language (XML) document or a HyperText Markup Language (HTML) document.

3. The non-transitory computer-readable storage medium of claim 1, wherein the markup language document comprises JavaScript.

4. The non-transitory computer-readable storage medium of claim 1, wherein the one or more sequences of instructions, when executed, further cause:

an HTML rendering engine, executing on the media server, passing through one or more audio streams to be incorporated into an output stream used in playing out the particular digital video without re-encoding the one or more audio streams.

5. The non-transitory computer-readable storage medium of claim 1, wherein the media server resides in a cloud-based playout environment.

6. An apparatus for playing out digital video with customized graphics, comprising:

one or more processors; and one or more non-transitory computer-readable storage mediums storing one or more sequences of instructions, which when executed, cause:

at a media server, one or more software modules identifying, for a particular digital video, a markup language document which describes a customized appearance of one or more graphics to be incorporated into a presentation of particular digital video; and the media server playing out the particular digital video with the one or more graphics in accordance with the markup language document, wherein said media server playing out the particular digital video comprises said media server transmitting the particular digital video from a broadcaster into a broadcast network.

7. The apparatus of claim 6, wherein the markup language document is an Extensible Markup Language (XML) document or a HyperText Markup Language (HTML) document.

8. The apparatus of claim 6, wherein the markup language document comprises JavaScript.

9. The apparatus of claim 6, wherein the one or more sequences of instructions, when executed, further cause:

an HTML rendering engine, executing on the media server, passing through one or more audio streams to be incorporated into an output stream used in playing out the particular digital video without re-encoding the one or more audio streams.

10. The apparatus of claim 6, wherein the media server resides in a cloud-based playout environment.

11. A method for playing out digital video with customized graphics, comprising:
- at a media server, one or more software modules identifying, for a particular digital video, a markup language document which describes a customized appearance of one or more graphics to be incorporated into a presentation of particular digital video; and
- the media server playing out the particular digital video with the one or more graphics in accordance with the markup language document, wherein said media server playing out the particular digital video comprises said media server transmitting the particular digital video from a broadcaster into a broadcast network.

12. The method of claim 11, wherein the markup language document is an Extensible Markup Language (XML) document or a HyperText Markup Language (HTML) document.

13. The method of claim 11, wherein the markup language document comprises JavaScript.

14. The method of claim 11, wherein the one or more sequences of instructions, when executed, further cause:
- an HTML rendering engine, executing on the media server, passing through one or more audio streams to be incorporated into an output stream used in playing out the particular digital video without re-encoding the one or more audio streams.

15. The method of claim 11, wherein the media server resides in a cloud-based playout environment.

\* \* \* \* \*